United States Patent
Cooper et al.

(10) Patent No.: US 7,417,644 B2
(45) Date of Patent: Aug. 26, 2008

(54) DYNAMIC PLUGGABLE USER INTERFACE LAYOUT

(75) Inventors: Kenneth Cooper, Seattle, WA (US); Ted Andrew Peters, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 10/435,772

(22) Filed: May 12, 2003

(65) Prior Publication Data

US 2004/0230940 A1 Nov. 18, 2004

(51) Int. Cl.
  G09G 5/00 (2006.01)
  G06F 17/00 (2006.01)
  G06F 3/048 (2006.01)
(52) U.S. Cl. .................. 345/619; 715/853; 715/243
(58) Field of Classification Search .......... 715/788, 715/794, 853; 718/800, 517; 345/619
  See application file for complete search history.

(56) References Cited

U.S. PATENT DOCUMENTS

| | | | |
|---|---|---|---|
| 5,689,665 A * | 11/1997 | Mitsui et al. | 715/803 |
| 5,760,772 A * | 6/1998 | Austin | 715/798 |
| 5,886,694 A * | 3/1999 | Breinberg et al. | 715/788 |
| 6,118,451 A * | 9/2000 | Alexander | 715/809 |
| 6,249,284 B1 | 6/2001 | Bogdan | 345/357 |
| 6,335,743 B1 * | 1/2002 | Owings | 715/801 |
| 6,456,305 B1 | 9/2002 | Qureshi et al. | 345/800 |
| 6,919,890 B2 * | 7/2005 | Halstead, Jr. | 345/440 |
| 6,944,829 B2 * | 9/2005 | Dando | 715/798 |
| 6,950,993 B2 * | 9/2005 | Breinberg | 715/801 |
| 7,013,431 B2 * | 3/2006 | Taylor et al. | 715/788 |

OTHER PUBLICATIONS

Siekmann, J. et al., "L Ω UI: Lovely Ω mega User Interface", *Formal Aspects of Computing*, 1999, 11, 326-342.

* cited by examiner

*Primary Examiner*—M Good Johnson
(74) *Attorney, Agent, or Firm*—Woodcock Washburn LLP (57) ABSTRACT

A framework for individually controlling the layout of display elements provides management of the layout automatically via pluggable policies. Control modules are dedicated to controlling the format of respective display elements. The control modules are organized into an ancestral hierarchy tree structure. Each parent control module specifies a policy object that manages the layout of its children, and provides measurement information to ancestor control modules. When an aspect of a control module changes that will affect its layout, it makes a single call which causes the framework to utilize the relevant layout managers to layout any affected control modules.

21 Claims, 8 Drawing Sheets

DYNAMIC PLUGGABLE USER INTERFACE LAYOUT

FIELD OF THE INVENTION

The present invention generally relates to display formatting and more specifically relates to dynamically controlling the layout of individual portions of a display utilizing pluggable layout objects.

BACKGROUND OF THE INVENTION

Typical graphic user interface (GUI) programming techniques are limited to statically and/or explicitly controlling the bounds of a display. The bounds, or limits, over which the display is controllable is often referred to as the display's layout. Static/explicit programming typically requires that specific values be used to define the boundaries of a display, and each time an update is to be made to the layout of the display, all the values need to be recalculated with explicit code. This adversely affects the implementation of scenarios in which the control bounds are to be dynamic, or at least appear dynamic to the user, because of the extensive amount of code required to manage this layout. This code is often burdensome to the programmer because of its complexity and because writing this code can be time consuming. This type of code can also adversely affect the user because the user may have to wait too long for the code to perform its function (i.e., to update the layout), thus negating the dynamic characteristic the code was designed to exhibit. These problems are exacerbated in situations where the potential exists for changes to the layout of one portion of a display to affect the layout of other portions of the display. These problems are also evident in situations in which an extensible model is desired. That is, in situations wherein developers can add new elements having their own dynamic layout, or use those provided by third parties.

Additionally, controls that are written to support dynamic adjustment of bounds are often error prone, and inefficient. An example of a scenario in which this type of code presents severe disadvantages is the increasingly common use of browser like interfaces to dynamically control the layout of a display. Browser-like interfaces extensively utilize text, localization (locale-specific text and images), and data-driven applications (dynamic updates and dynamic creation of user interfaces), and thus present many opportunities to make dynamic changes to the layout of display content. Existing techniques for enabling these dynamic changes suffer from the above-mentioned disadvantages of being error-prone, inefficient, and being difficult to implement.

Therefore, the ability to dynamically control the layout of displays without suffering the above disadvantages is desired.

SUMMARY OF THE INVENTION

The layout (e.g., dimensions) of a display is controlled via control modules. A display includes nested display elements (e.g., windows). The layout of each display element is individually controlled by an associated, dedicated control module. The control modules are organized into an ancestral hierarchy tree structure defined by the nested structure of the display elements. Each parent control module of the hierarchy specifies a policy object that manages the layout of its children, and provides measurement information to ancestor control modules. Each control module manages its own layout unless overridden by a parent control module. This technique ensures that a low-level display element whose layout is dependent on the metrics of a higher-level element will be laid out in accordance with the requirements of that higher-level element.

A method for controlling layouts of display elements of a display, includes organizing a plurality of control modules into an ancestral tree hierarchy, managing a layout of a control module by an existing directly related ancestor control module of the hierarchy, and individually controlling a layout of each display element by a respective control module. A system for implementing this method includes a display device for providing the display and a display processor coupled to the display device. The display processor individually controls layouts of each display element. The display processor includes a plurality of control modules organized in an ancestral tree hierarchy. The layout of each display element is controllable by an associated control module and each control module's layout is managed by an existing directly related ancestor control module.

BRIEF DESCRIPTION OF THE DRAWINGS

The foregoing and other objects, aspects and advantages will be better understood from the following detailed description with reference to the drawings, in which.

DETAILED DESCRIPTION OF ILLUSTRATIVE EMBODIMENTS

A system and method for dynamically laying out a display utilizing pluggable control modules in accordance with an embodiment of the present invention provides a user, such as a designer of a web page, the ability to individually control the layout (e.g., boundaries, dimensions) of display elements (e.g., separate regions) of the display without requiring all the display elements of the display to be reformatted when one portion of the layout changes. Each control module is dedicated to controlling the format of a particular display element. The control modules are organized into an ancestral hierarchy tree structure. This hierarchy includes parent control modules and children control modules. Each parent control module specifies a policy object that manages the layout of its children, and provides measurement information to ancestor control modules. Throughout this document, the terms "layout" and "format" are used interchangeably to refer to setting the boundaries and/or dimensions of a display element (e.g., the boundaries/dimensions of the "box" in which an image is to be rendered).

When a display element is to be reformatted, this fact is recorded by setting a state bit indicating that the control module's layout is invalid. The control modules having this state bit set are then traversed, in depth first traversal order. When the state bit is set, the control module is added to a queue of controls with invalid layout measurements. The queue is sorted in depth order and then traversed from deepest to highest. The queue is traversed in this order because the layout measurements for a parent depend upon the layout measurements of its descendents, and thus should be current before the parent is asked to recalculate. During this traversal, as each control module is encountered, it is revalidated. That is, formatting metric values associated with the update stored in the encountered control module are recalculated. If an ancestor control module (e.g., parent, grandparent) is affected by this update, its formatting metric values are recalculated. Formatting metrics include values associated with the display element being formatted. Example formatting metrics include minimum width, maximum width, preferred width, minimum height, maximum height, and preferred height. Next, the control modules are laid out. The lay out process is conducted in top down order. Each invalid control module manages its own layout unless a parent control module overrides it. Thus, each invalid control module determines the boundaries for its associated display element. However, these boundaries are subject to approval by a parent control module (if one exists).

Figure 1:
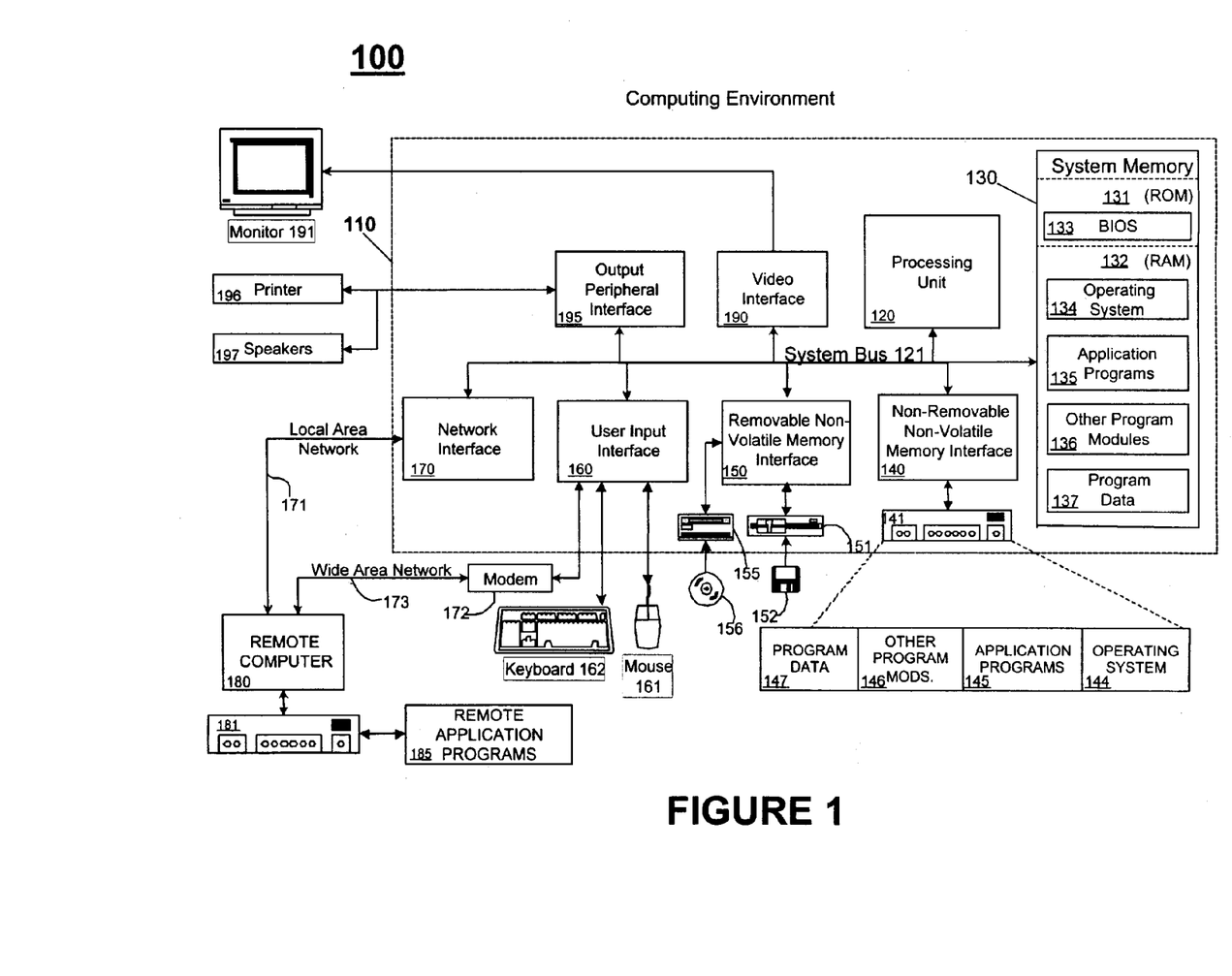
FIG. 1 is a block diagram showing an exemplary computing environment in which aspects of the present invention may be implemented.

FIG. 1 illustrates an example of a suitable computing system environment 100 in which the method and system for dynamically and individually controlling display elements may be implemented. The computing system environment 100 is only one example of a suitable computing environment and is not intended to suggest any limitation as to the scope of use or functionality of the method and system for dynamically and individually controlling display elements. Neither should the computing environment 100 be interpreted as having any dependency or requirement relating to any one or combination of components illustrated in the exemplary operating environment 100.

The method and system for dynamically and individually controlling display elements are operational with numerous other general purpose or special purpose computing system environments or configurations. Examples of well known computing systems, environments, and/or configurations that may be suitable for use with the method and system for dynamically and individually controlling display elements include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The method and system for dynamically and individually controlling display elements may be described in the general context of computer-executable instructions, such as program modules, being executed by a computer. Generally, program modules include routines, programs, objects, components, data structures, etc. that perform particular tasks or implement particular abstract data types. The method and system for dynamically and individually controlling display elements may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the method and system for dynamically and individually controlling display elements includes a general purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. It is to be understood that combinations of any of the are also included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, are typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM, CDRW, or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the method and system for dynamically and individually controlling display elements may also be implemented via an operating system, application program interface (API), or a "middle man" object between a coprocessor and requesting object, such that services may be performed by, supported in, or accessed via all of .NET's languages and services, and in other distributed computing frameworks as well.

Figure 2:
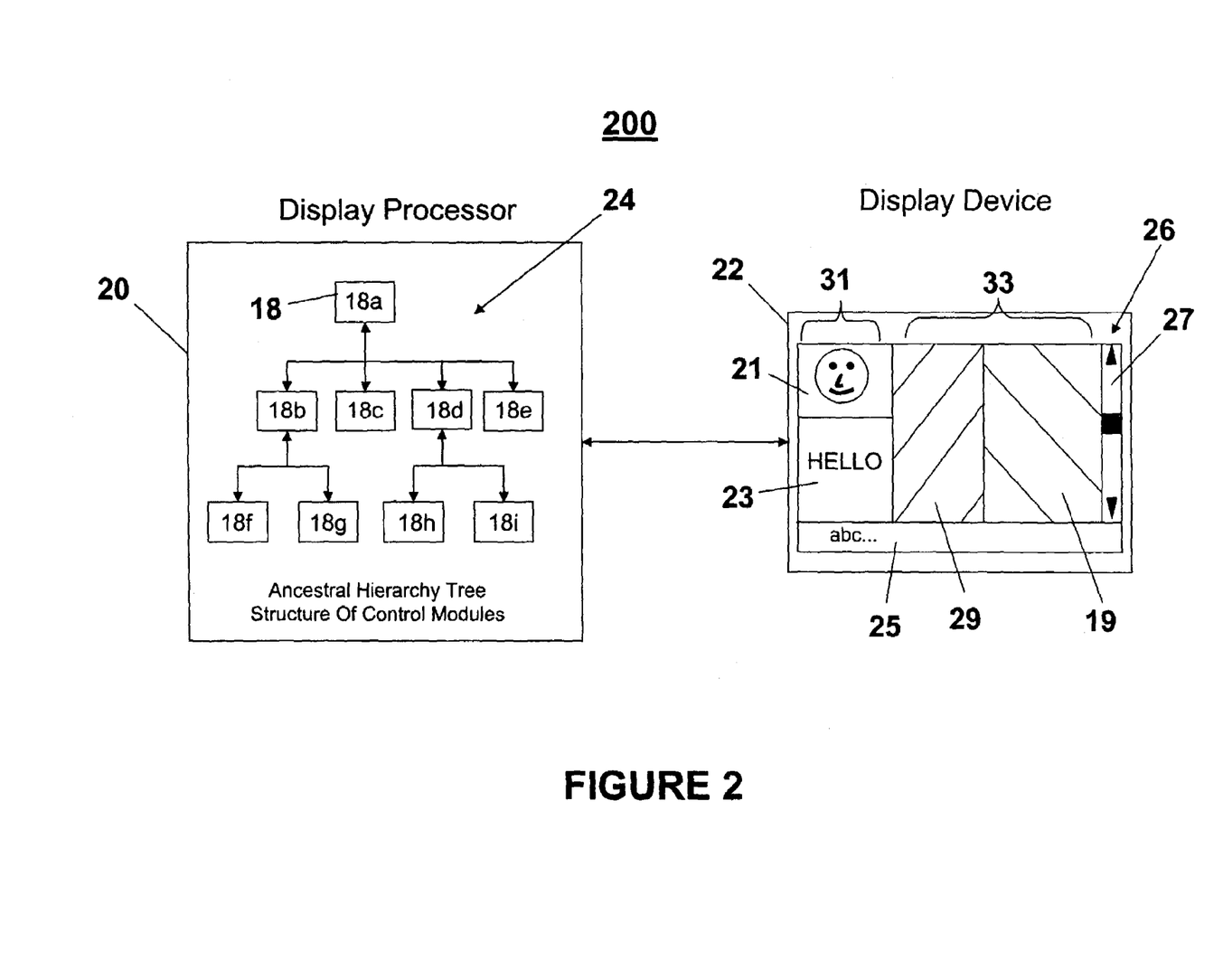
FIG. 2 is an illustration a system for dynamically and individually controlling the format of display elements in accordance with an exemplary embodiment of the present invention.

FIG. 2 is an illustration of a system 200 for dynamically and individually controlling the format of display elements. The system 200 comprises a display processor 20 and a display device 22. The display processor 20 comprises a plurality of control modules 18. The control modules 18 are organized into an ancestral hierarchy tree 24. The display (i.e., the aggregate visual image that is to be rendered) of the display device 22 may include any number of display elements. Notice that some display elements are nested within other display elements. For example, the display shown in FIG. 2 includes display element 26, which contains the display elements 25, 27, 31, and 33. The display element 31 contains the display elements 21 and 23. The display element 33 contains the display elements 19 and 29. Any type of visual image may be rendered within each display element. As shown in FIG. 2, the display element 21 renders a graphic (a smiley face), the display elements 23 and 25 render text ("HELLO"), the display elements 19 and 29 render arbitrary video (indicated by the diagonal lines), and the display element 27 renders a scroll bar.

Each control module 18 is associated with, and controls, the format (also referred to as layout or boundaries) of one of the display elements. That is, there is a one-to-one correspondence between each control module 18 and each display element. For example, the control module 18a may be associated with and control the layout of the display element 26. The control modules 18b, 18c, 18d, and 18e, may be associated with and control the layout of display elements 31, 25, 33, and 27, respectively. The control modules 18f and 18g may be associated with and control the layout of display elements 21 and 23, respectively. Finally, the control modules 18h and 18i may be associated with and control the layout of display elements 29 and 19, respectively. It is to be understood that the depiction of a hierarchy 24 and the display elements therein, as shown in FIG. 2, is exemplary, and not to be limited thereto. A more detailed example of the relationship between control modules in the ancestral hierarchy, how display element formats are controlled by control modules, and how the hierarchy corresponds to the nesting of display elements within each other, is provided below in connection with FIGS. 3 and 4.

Figure 3:
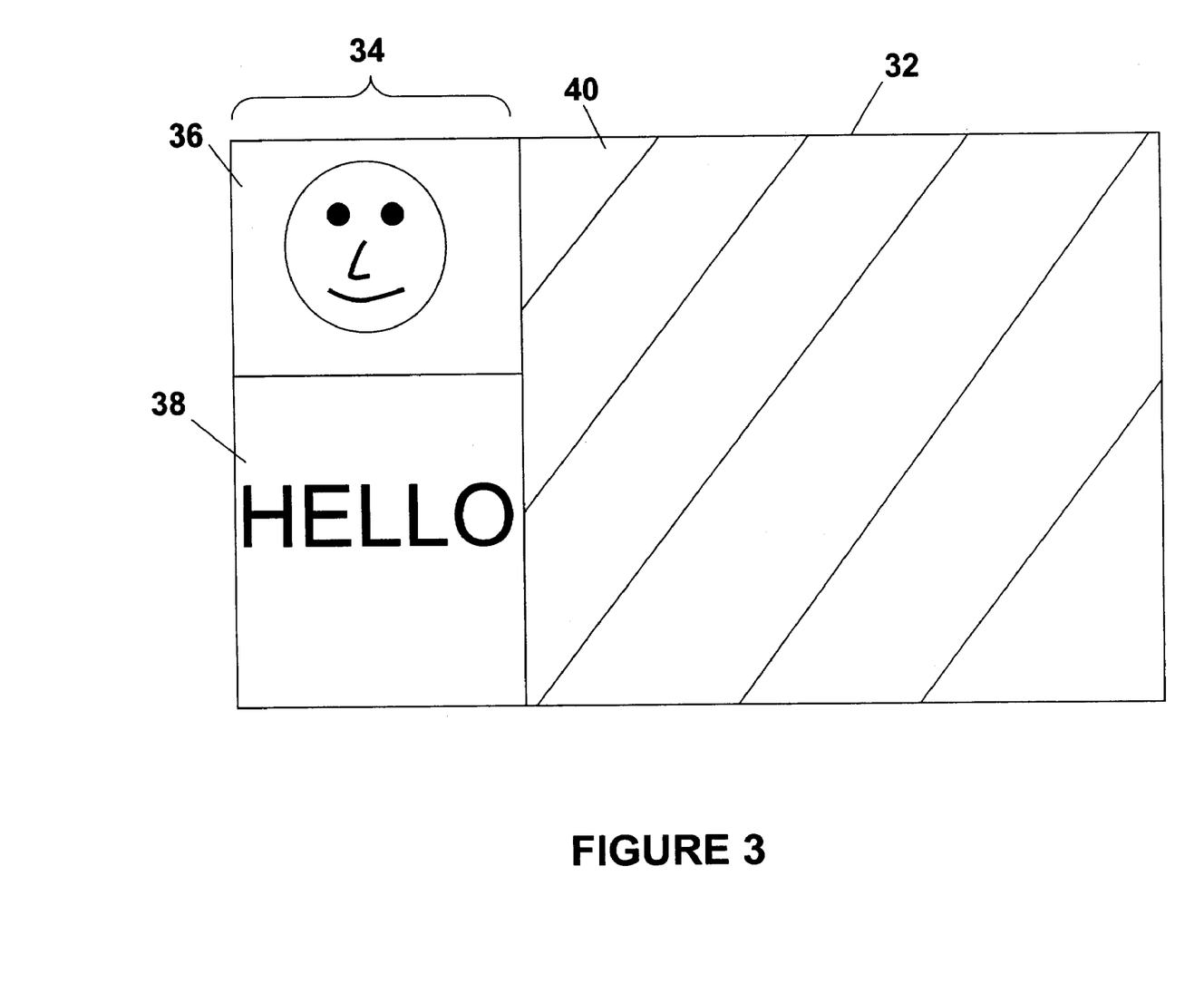
FIG. 3 is an illustration of an exemplary display having display elements in accordance with an exemplary embodiment of the present invention.

FIG. 3 is an illustration of an exemplary display having display elements 32, 34, 36, 38, and 40, wherein display elements 36 and 38 are nested within display element 34, and display elements 34 and 40 are nested within display element 32. In one embodiment, as described in more detail below, the relative nesting of one display element within another corresponds to a particular control module's position in its ancestral hierarchy. That is, the fact that element A is nested within element B generally means that, within the control module hierarchy, the control module that determines the layout of element A is a child of the control module that produces element B. It is to be understood that the particular set of elements shown in FIG. 3, and the nesting thereof, is merely exemplary, and that one can imagine limitless other examples of display elements being nested within other display elements. In the example of FIG. 3, a graphic is rendered within display element 36, text is rendered within display element 38, and arbitrary video (indicated by diagonal lines) is rendered within display element 40. As the dimensions of a given display element are updated, display elements that are nested within that given display element and that require changes to their dimensions are updated. Display elements not requiring changes need not have their dimensions recalculated.

Figure 4:
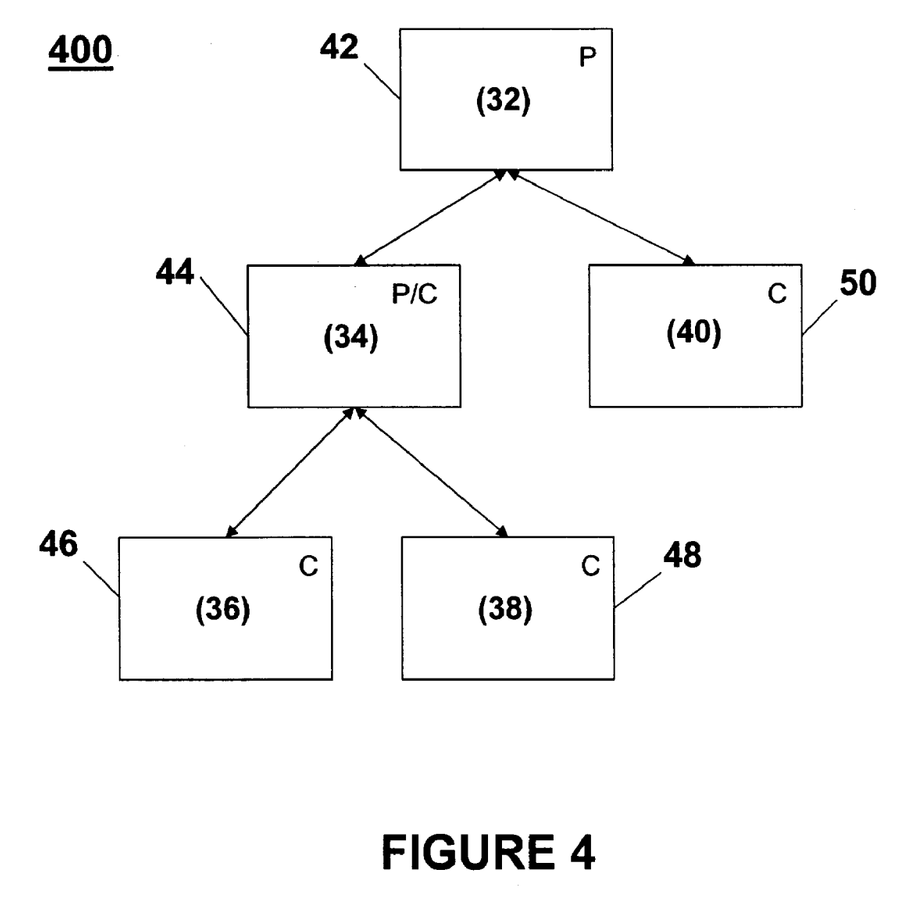
FIG. 4 is a block diagram of an ancestral hierarchy comprising a plurality of control modules in accordance with an exemplary embodiment of the present invention.

FIG. 4 is a block diagram of an ancestral hierarchy 400 comprising a plurality of control modules. Each control module of the hierarchy 400 is associated with a respective display element of FIG. 3, as indicated by the number in parentheses in each control module. Control module 42 is associated with display element 32, the control module 44 is associated with display element 34, control module 46 is associated with display element 36, control module 48 is associated with display element 38, and control module 50 is associated with display element 40. A control module is responsible for controlling the format of the display element with which it is associated. Thus, control module 42 controls the format of display element 32, control module 44 controls the format of display element 34, control module 46 controls the format of display element 36, control module 48 controls the format of display element 38, and control module 50 controls the format of display element 40. Various association strategies may be implemented. For example, rather than associating each control module with a display element (e.g., control module 46 associated with display element 36 and control module 48 associated with display element 38, as shown), a single control module could be associated with plural display elements (e.g., a single control module could control the formatting of display element 34, and its sub-elements 36 and 38).

The ancestral hierarchy 400 comprises control modules performing functions of parent control modules, child control modules, and a combination thereof. Each control module depicted in the hierarchy 400 is labeled with the letter "C" indicating that it is a child control module, "P" indicating that it is a parent control module, or "P/C" indicating that it is both a parent and a child control module. Control module 42 is the parent of control modules 44 and 50. Accordingly, control modules 44 and 50 are the children of control module 42. Control module 44 is also the parent of control modules 46 and 48. Accordingly, control modules 46 and 48 are the children of control module 44. Thus control module 44 is both a parent control module (of control modules 46 and 48), and a child control module (of control module 42). Parent control modules are positioned in higher levels within the ancestral hierarchy than their children. Control module 42 is positioned in a level higher than its children (control modules 44 and 50). Control module 44 is positioned in a higher level than its children (control modules 46 and 48). Thus, as depicted in FIG. 4, the control module 42 is positioned in the highest level of the hierarchy 400 and the control modules 46 and 48 are positioned in the lowest level of the hierarchy 400.

In accordance with an embodiment of the present invention, relationships (also referred to as contracts) are defined between parent and child control modules within the ancestral hierarchy. The formats of display elements are controlled by respective control modules in accordance with the defined relationships. Each parent control module manages formats of respective display elements of its children control modules, and each control module having no parent control module manages formats of its respective display element. Thus, as depicted in the hierarchy 400, the control module 42 manages the bounds of control modules 44 and 50, and also manages its own bounds. The control modules 44 and 50 utilize these bounds to control the format of their respective display elements, 34 and 40. Similarly, the control module 44 manages the bounds of the control modules 46 and 48. The control modules 46 and 48 utilize these bounds to control the format of their respective display elements, 36 and 38. The control module 42 has no parent, thus it manages its own bounds. By managing the bounds of its children control modules, a parent control module defines the policy for its children control modules. In essence, a parent control module dictates the bounds of its children control modules. A child control module can attempt to set its own bounds, but any control module that has a parent can have its settings overridden by the parent. Each child control module has layout manager-specific information associated with it that it provides to its parent control module. The parent control manager then consumes that information to determine how to layout that particular child control module.

Figure 5:
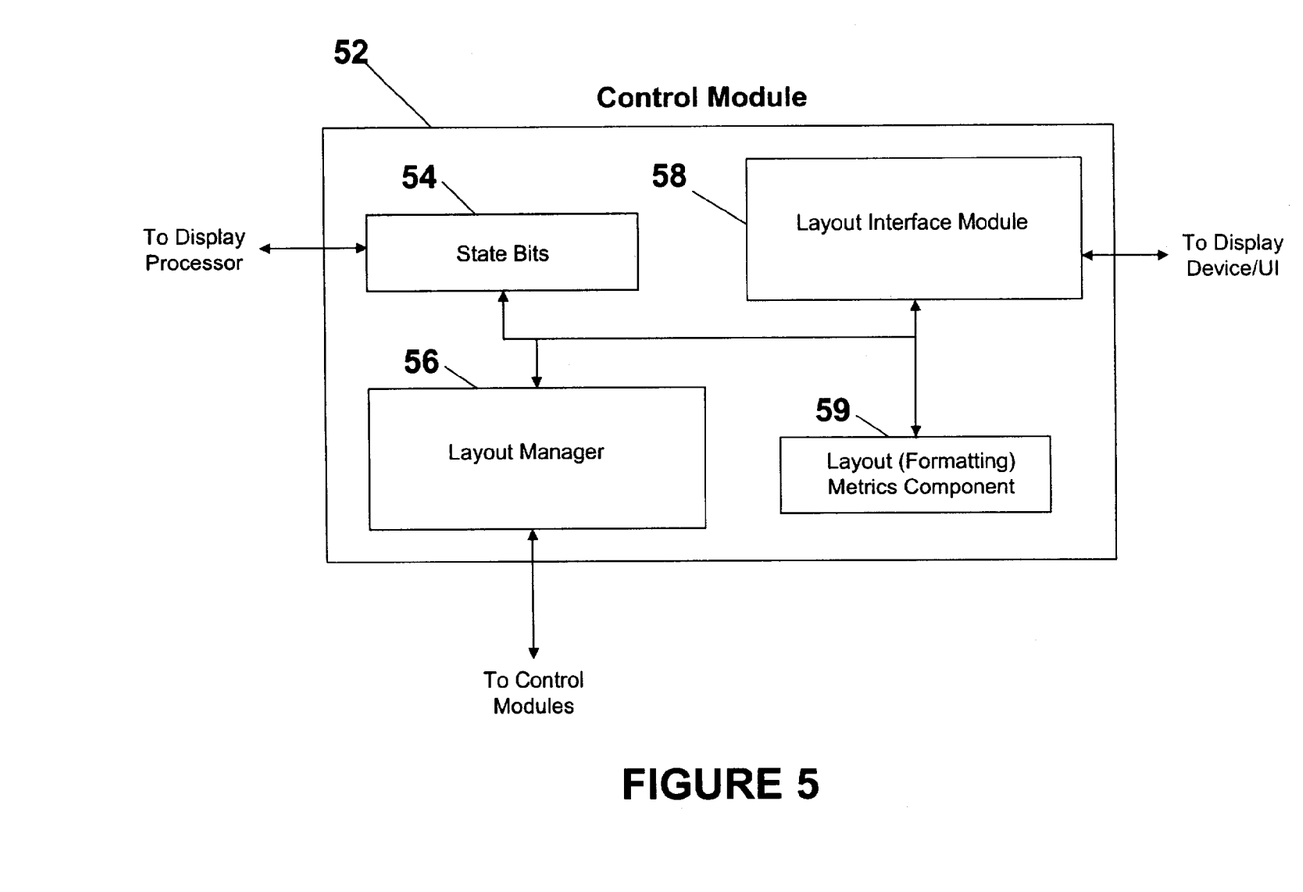
FIG. 5 is a block diagram of the components of an exemplary control module in accordance with an exemplary embodiment of the present invention.

FIG. 5 is a block diagram of the components of an exemplary control module 52. The control module 52 comprises state bits 54, a layout manager 56, a layout interface module 58, and formatting metrics (also referred to as layout metrics) component 59. The state bits 54 indicate the state of the control module with respect to the validity of its layout. The state bits 54 also indicate the state of the control module with respect to the validity of it layout measurements. In one embodiment, the state bits 54 are utilized by the display processor to determine if a control module's layout is valid. If the layout of a control module is invalid (implying that a request to update the respective display element has been received, but that the update has not yet been performed), the state bit 54 is set. Once the control modules formatting metrics have been updated, the state bit 54 is reset.

Layout manager 56 is a pluggable, reusable policy object. Layout manager 56 determines formatting metric values for a given control module's children. The layout manager 56 manages the setting of its children control module's bounds, and also determines (calculates) the layout measurement information about the control module 52 with which layout manager 56 is associated (e.g., its host control module).

In one embodiment, the layout manager 58 is utilized to obtain information from each of its host control module's children, pertaining to a child-specific layout specification. Each child control module has layout manager-specific information associated with it that it provides to the layout manager 58. For example, such information could include vertically aligning a display object with insets of pixels on all sides, e.g., "I am vertically aligned with insets of 5 pixels around me". The layout manager 58 then consumes that information in determining how to lay out that particular child. The layout manager 58 provides to the children control modules their bounds.

The layout interface module 58 facilitates communication with the control module 52. The layout interface module 56 also communicates with the layout manager 58, thereby facilitating the pluggable characteristics of the layout manager 58.

The layout metrics component 59 includes the formatting metric values utilized to control the format of the control module's 52 respective display elements. The layout metrics component 59 includes formatting metric values that were determined (calculated) during a previous layout operation (described in more detail below). Example layout metrics include preferred size, (e.g., width, height), minimum size, maximum size, constrained size, or a combination thereof. Values of formatting metrics stored in the layout metrics component 59 are indicative of the type of measurement (e.g., width, height), a constraint if the measurement request was for a constrained value (e.g. preferred width given a specific height), and the currently valid calculated formatting metric value. The layout metrics component 59 functions as a cache for calculations determined by the parent control module's layout manager, thereby mitigating the calculation cost of a complex layout. The layout metrics component 59 also contains a list of values to compare against when determining whether a control module's metric values have changed. As described below, this act of comparison is performed when traversing the hierarchy upward from it lowest level to determine which control modules have invalid layouts.

Figure 6:
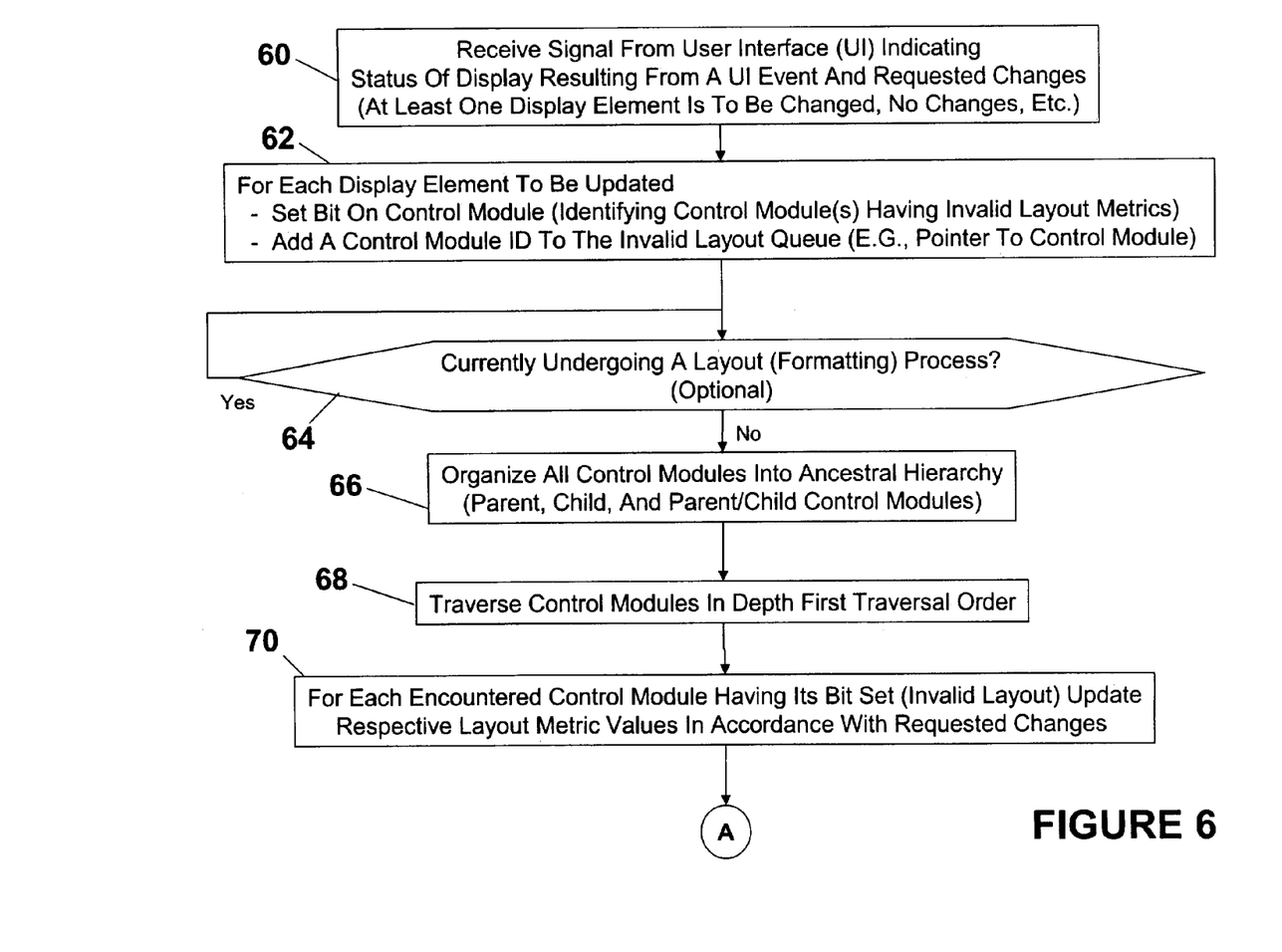
FIGS. 6-8 contain a flow diagram of an exemplary process for individually controlling formats of display elements of a display in accordance with an exemplary embodiment of the present invention.
Figure 7:
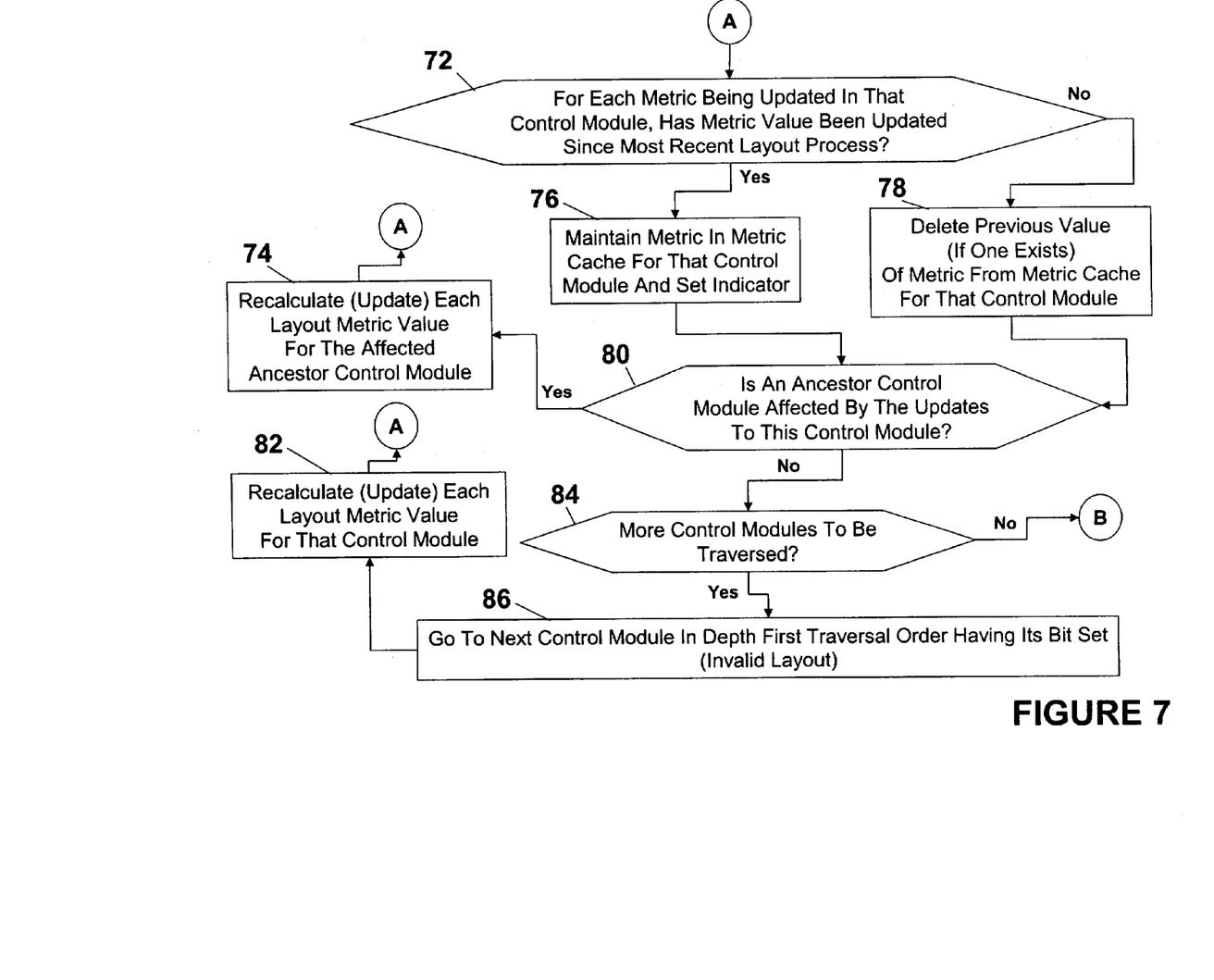
Figure 8:
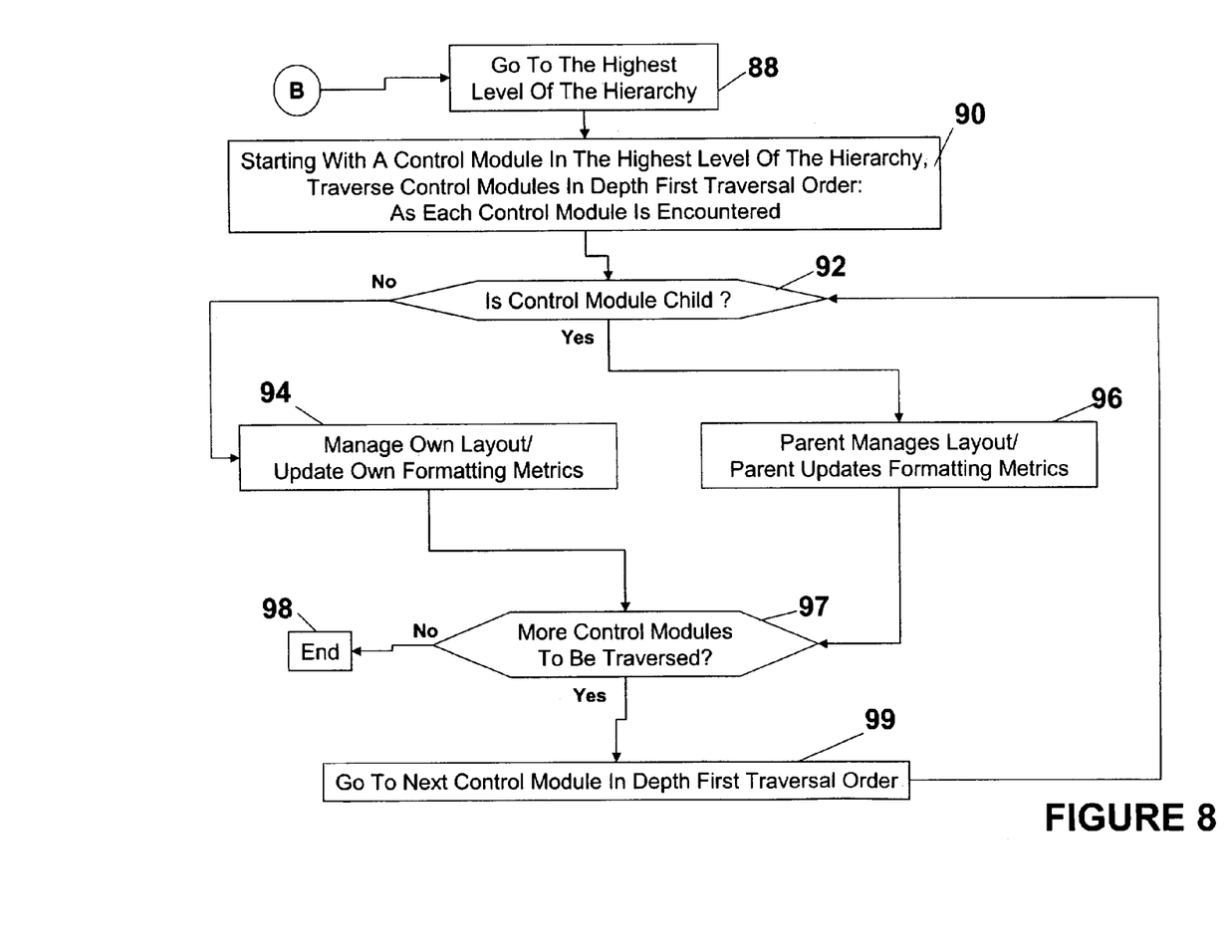

FIG. 6, FIG. 7, and FIG. 8, contain a flow diagram of an exemplary process for individually controlling formats of display elements of a display. First, control modules are associated with respective display elements, in order to define, to the display processor, the hierarchy among controls. Characteristics and properties of the layout managers of the control modules are also specified. The associations, the number of control modules, and/or the layout managers, may be dynamically updated to accommodate changes, e.g., if display elements are added to the content that is being laid out, controls can be added to the hierarchy. In an exemplary application, a web designer might update the layout by changing the size of some display elements. These changes could be implemented by a designer's user interface (UI), for example. As a result of these changes, preferred parameters (formatting metric values) are entered into the control module in the hierarchy that controls the display element being changed. These formatting metric values are preferred, and not actual, because the designer ca not definitively change the formatting metric values, except for those of the top-level control module. The update may include changing a size of one or more display elements or keeping the size the same (no change). A signal is sent to the display processor indicative of this status. The signal may be sent from the display processor, or any appropriate user interface (UI).

At step 60 of FIG. 6, a signal is received indicating the status of a display. This signal may include formatting metric values to be updated and/or added for one or more display elements. At step 62, for each display element to be updated, a respective control module is identified. The fact that this control module will need to have its metrics updated is recorded in some manner so that the display processor can later perform the update. For example, a bit may be set (e.g., state bit 54) on the control module indicating that the element's current metrics are invalid and that the format for that display element is to be updated. Also, a control module identifier (ID) may be added to an invalid layout queue, which resides in the processor hosting the control modules (e.g., the display processor 20). The invalid layout queue is utilized to ensure that all control modules having invalid layouts are processed. In one embodiment, if a current layout process is in progress, the processing of the control objects to update the formats of the display elements is delayed until the current layout process is complete, as indicated at step 64. During that time (while the current layout process is proceeding), the invalid layout queue is updated to reflect control modules, whose respective display elements require updates. Once the current layout process is complete, the control modules listed on the invalid layout queue are updated, as described below. This embodiment is optional, however. Processing may begin before the current layout process is complete. This is especially applicable to updates to the scroll bar (e.g., scroll bar 27), which requires information pertaining to the current amount of information to be displayed. For example, if the amount of information to be displayed is observable on the display without scrolling, the scroll bar need not (and often is not) be displayed. If the amount of information to be displayed is not observable on the display without scrolling, then the scroll bar is displayed.

At step 66, all the control modules are organized into an ancestral hierarchy (e.g., hierarchy 24). In one embodiment, the control module IDs in the invalid layout queue are traversed "in-order" in depth first traversal order, at step 68. Depth first traversal is well known in the art. As each control module is encountered, a determination is made as to whether the encountered control module has a valid layout at step 70. For example, a state bit, such as state bit 54 or any other appropriate indication means, may be checked. If the state bit is set, the layout is invalid; if the state bit is not set, the layout is valid. Also, at step 70, for each encountered control module having its indicator set (indicating invalid layout), the formatting metric values (also referred to as layout metric values) are updated. Updating a formatting metric value may include recalculating a formatting metric value, replacing a formatting value, or allowing the formatting metric value to remain unchanged.

Over the course of several layout cycles, a large number of formatting metric values may accumulate. To reduce the size of the metric cache in each control module, some, but not all, previous metric values are deleted from respective caches. In one embodiment, only metric values that have been requested by a parent during a previous (immediately preceding) layout cycle are maintained.

At step 72 for each metric being updated, it is determined if that metric has changed value with respect to the previous (immediate preceding) layout process. If the metric value was updated since the previous layout process, the current updated value is maintained in the metric cache for that control module at step 76. An indicator is set (e.g., a bit) indicating that the metric was updated since the immediately preceding layout process. If the metric value was not updated since the previous layout process, and if a previous metric value exists (e.g., check indicator bit), then that previous metric value is deleted at step 78. The processes performed at steps 72, 76, and 78, as described above are referred to as revalidation. At step 80 it is determined if any ancestor control module is affected by the updates to the current formatting metrics (e.g., if an ancestor requires a change to one or more of its respective formatting metrics by virtue of an update to the current formatting metrics). Ancestor control modules include control modules further up the chain of ancestors (e.g., parent, grandparent, great grandparent). If an ancestor control module is affected, the formatting metrics for that ancestor are updated and the process of revalidation for those formatting metrics is performed (i.e., go to step 72) at step 74. At step 80, it is determined if more control objects are to be encountered in the depth first traversal order. If so, than at step 80, control modules are upwardly traversed in depth first traversal order until a control module having its invalid layout indicator set is encountered. The formatting metrics for that encountered control module are updated and the process of revalidation for those formatting metrics is performed (i.e., go to step 72) at step 82. If, at step 84, it is determined that no more control modules are to be upwardly traversed in depth first traversal order, than the layout process begins.

Next, starting at the highest level of the hierarchy of control modules (step 88), the hierarchy is downwardly traversed in depth first traversal order (step 90). As each control module is encountered during this traversal, it is determined, at step 92, if the encountered control module is a child control module. If the encountered control module is a child control module, then at step 96, it is determined if the encountered control module is identified as a control module having an invalid layout. If the control module has a valid layout then the next control module is traversed in depth first traversal order at step 97. If the encountered control module is identified as having an invalid layout, then the formatting metrics of the encountered control module associated with the respective display element are updated (layout managed) by its parent control module at step 96. The format of the respective display element is updated in accordance with the requested formatting metrics for that display element and the formatting metrics in the encountered control module's parent's formatting metric cache. Thus, a child control module's parent determines the formatting metrics for its children. If it is determined, at step 92 that the encounter control module is not a child control module, then at step 94 it is determined if the encountered control module is identified as a control module having an invalid layout. If the control module has a valid layout then the next control module is traversed in depth first traversal order at step 97. If the encountered control module is identified as having an invalid layout, then the formatting metrics of the encountered control module associated with the respective display element are updated at step 94. That is, the encountered control module updates its own formatting metrics/manages its own layout. The format of the respective display element is updated in accordance with the formatting metrics in the encountered control modules formatting metric cache (indicative of the requested formatting metrics for the respective display element). If, at step 97, it is determined that more control modules are to be traversed in depth first traversal order, the next control module is encountered at step 99, and the layout process begins again at step 92. If, at step 97, it is determined that no more control modules are to be traversed, then the layout process is ended at step 98.

In another embodiment, control modules may opt not to be laid out by their parent control module's layout manager, and instead be laid out relative to the bounds of control modules that have already been laid out. Such control modules are laid out during a second pass layout process. During a first pass, control modules that are attributed as such are not presented to their parent's layout manager as candidates for layout during the first pass. These control modules are then laid out during a second pass, which does not include the control modules laid out during the first pass. They are laid out by a layout manager implementing an interface specifically defined for this purpose; it works against the bounds of other elements in the tree rather than against the size of its parent element. Control modules that are attributed in this way may themselves contain a hierarchy of controls that are not independently laid out, following the process described above.

As mentioned above, while exemplary embodiments of the present invention have been described in connection with various computing devices and network architectures, the underlying concepts may be applied to any computing device or system in which individual display elements of a display are dynamically formatted. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

A method for formatting display elements as described herein may be embodied in the form of computer-implemented processes and system for practicing those processes. A method for formatting display elements as described herein may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes a system for practicing the invention. The method for formatting display elements as described herein may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes a system for practicing the invention. When implemented on a general-purpose processor, the computer program code segments configure the processor to create specific logic circuits.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

A system and method for controlling the format of display elements as described above provide efficient, automatic recalculation and layout of a hierarchical set of control modules. A pluggable layout policy is provided via the layout managers in the control modules. This pluggable layout policy is provided at each level in the control modules ancestral hierarchy. This system and method also provide means for virtualization of control modules, and for bounding the total number of control modules created. Means are also provided for extending the use of layout managers to non-control elements (e.g. points on a path), and for attaching control modules to the control module hierarchy, yielding controls that move/size with layout, but do not influence it. The system and method also provide means for laying out not just direct children, but deeper descendents as well. This is advantageous in scenarios involving data driven lists, where it is desired to line up the control modules of each list item as though they were collectively in a large table.

While the present invention has been described in connection with the exemplary embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed is:

1. A method for controlling layouts of display elements of a display, said method comprising:
   organizing a plurality of control modules into an ancestral tree hierarchy;
   managing a layout of a control module by an existing directly related ancestor control module of said hierarchy;
   individually controlling a layout of each display element by a respective control module, the layout of each element being consistent with any requirements imposed by an ancestor of the element's control module;
   receiving a proposed formatting metrics update for at least one of the plurality of control modules that has a directly related ancestor control module;
   identifying the control modules having associated display elements with layouts that would be updated by the proposed formatting metrics update, wherein only the directly related ancestor control module manages the layout of each respective child control module in accordance with:
   the proposed formatting metrics update; and
   layout information provided by the child control module to the directly related ancestor control module;
   updating layouts corresponding to the identified control modules; and rendering at least one of the display elements in accordance with the updated layout.

2. A method in accordance with claim 1, further comprising:
   traversing said hierarchy in depth first traversal order; and
   determining formatting metric values for an encountered control module in accordance with said encountered control module's existing directly related ancestor control module's formatting metric values and in accordance with the encountered control module's formatting metric values.

3. A method in accordance with claim 2, further comprising:
   maintaining a previous formatting metric value if said previous formatting metric value was updated during an immediately preceding act of controlling a layout.

4. A method in accordance with claim 1, wherein each control module comprises a pluggable, replaceable layout manager policy object for managing respective formats.

5. A method in accordance with claim 1, wherein said formatting metric comprises at least one of preferred size, minimum size, maximum size, and constrained size.

6. A method for controlling layouts of display elements of a display, a layout of each display element being controllable by an associated control module, each control module comprising formatting metrics for controlling a layout of an associated display element, said method comprising:
   receiving requested formatting metric values indicative of a request to update a layout of at least one display element;
   identifying control modules associated with each display element to be updated;
   organizing all control modules into an ancestral tree hierarchy;
   traversing said hierarchy in depth first traversal order; and
   as each identified control module is encountered:
      updating the identified encountered control module's formatting metric values in accordance with:
         said identified encountered control module's existing directly related ancestor control module's formatting metric values; and
         requested formatting metric values associated with the encountered identified control module's associated display element; and
   rendering at least one of the display elements in accordance with the updated layout.

7. A method in accordance with claim 6, further comprising:
   maintaining a previous formatting metric value if said previous formatting metric value was updated during an immediately preceding act of controlling a layout.

8. A method in accordance with claim 6, wherein said formatting metrics comprise at least one of preferred size, minimum size, maximum size, and constrained size.

9. A method in accordance with claim 6, wherein each control module comprises a pluggable, replaceable layout manager policy object for updating respective formats.

10. A system for controlling layouts of display elements of a display, said system comprising:
   a display device for providing said display; and
   a display processor, coupled to said display device, for individually controlling layouts of each display element, said display processor comprising a plurality of control modules organized in an ancestral tree hierarchy, wherein:
a layout of each display element is controllable by an associated control module;
each control module's layout is managed by an existing directly related ancestor control module; and
the display processor is configured to:
receive a proposed formatting metrics update for at least one of the plurality of control modules that has a directly related ancestor control module;
identify control modules having associated display elements with layouts to be updated by the proposed formatting metrics update, wherein only the directly related ancestor control module manages the layout of each respective child control module in accordance with:
the proposed formatting metrics update; and
layout information provided by the child control module to the directly related ancestor control module;
update layouts corresponding to the identified control modules.

11. A system in accordance with claim 10, each control module comprising:
a pluggable, replaceable layout manager policy object for managing respective layouts; and
a layout interface module for communicating with said display device.

12. A system in accordance with claim 10, each control module further comprising formatting metrics for controlling a format of an associated display element, wherein said formatting metrics comprise at least one of preferred size, minimum size, maximum size, and constrained size.

13. A computer readable storage medium encoded with a computer program code for directing a computer processor to control layouts of display elements of a display, a format of each display element being controllable by a respective control module, each control module comprising formatting metrics for controlling a format of a respective display element, said program code comprising:
a receive request code segment for causing said computer processor to receive requested formatting metrics indicative of a request to update a format of at least one display element;
an identify code segment for causing said computer processor to identify control modules associated with each display element to be updated;
an organize code segment for causing said computer processor to organize all control modules into an ancestral tree hierarchy;
a traverse code segment for causing said computer processor to traverse said hierarchy in depth first traversal order; and
an update format code segment for causing said computer processor to, as each identified control module is encountered:
update the identified encountered control module's formatting metric values in accordance with:
said identified encountered control module's existing directly related ancestor control module's formatting metric values; and
requested formatting metric values associated with the encountered identified control module's associated display element.

14. A computer readable storage medium in accordance with claim 13, said program code further comprising:

a maintain metric code segment for causing said computer processor to maintain a previous formatting metric value if said previous formatting metric value was updated during an immediately preceding act of controlling a layout.

15. A computer readable storage medium in accordance with claim 13, wherein said formatting metrics comprise at least one of preferred size, minimum size, maximum size, and constrained size.

16. A computer readable storage medium in accordance with claim 13, wherein each control module comprises a pluggable, replaceable layout manager policy object for updating respective formats.

17. A computer readable storage medium encoded with a computer program code for directing a computer processor to control layouts of display elements of a display, said program code comprising:
an organize code segment for causing said computer processor to organize a plurality of control modules into an ancestral tree hierarchy;
a manage code segment for causing said computer processor to manage a layout of a control module by an existing directly related ancestor control module of said hierarchy; and
a control code segment for causing said computer processor to individually control a layout of each display element by a respective control module, the layout of each element being consistent with any requirements imposed by an ancestor of the element's control module;
an identify code segment for causing said computer processor to identify control modules having associated display elements with layouts to be updated based on a proposed formatting metrics update received for at least one of the plurality of control modules that has a directly related ancestor control module;
a traverse code segment for causing said computer processor to traverse said hierarchy in depth first traversal order;
an update code segment for causing said computer processor, as each identified control module is encountered, to update layouts corresponding to the identified control modules, wherein only the directly related ancestor control module manages the layout of each respective child control module in accordance with:
the proposed formatting metrics update; and
layout information provided by the child control module to the directly related ancestor control module.

18. A computer readable storage medium in accordance with claim 17, said program code further comprising:
a determine code segment for causing said computer processor to determine formatting metric values for an encountered control module in accordance with said encountered control module's existing directly related ancestor control module's formatting metric values and in accordance with the encountered control module's formatting metric values.

19. A computer readable storage medium in accordance with claim 18, said program code further comprising:
a maintain code segment for causing said computer processor to maintain a previous formatting metric value if said previous formatting metric value was updated during an immediately preceding act of controlling a layout.

20. A computer readable storage medium in accordance with claim 17, wherein a format comprises at least one of preferred size, minimum size, maximum size, and constrained size.

21. A computer readable storage medium in accordance with claim 17, wherein each control module comprises a pluggable, replaceable layout manager policy object for managing respective formats.

\* \* \* \* \*